United States Patent [19]

Mueller et al.

[11] Patent Number: 4,825,208
[45] Date of Patent: Apr. 25, 1989

[54] METHOD FOR FLOW CONTROL OF DATA WITHIN A MESHED DATA NETWORK

[75] Inventors: Wilhelm Mueller, Berlin; Werner Schneider, Munich, both of Fed. Rep. of Germany

[73] Assignee: Siemens Aktiengesellschaft, Berlin and Munich, Fed. Rep. of Germany

[21] Appl. No.: 39,432

[22] Filed: Apr. 17, 1987

[30] Foreign Application Priority Data

Apr. 23, 1986 [DE] Fed. Rep. of Germany ....... 3614062

[51] Int. Cl.$^4$ .................. H04Q 9/00; H04Q 11/04
[52] U.S. Cl. ............................ 340/825.020; 370/85
[58] Field of Search ............ 340/825.02, 825.06, 340/825.16; 370/79, 83, 84, 99, 85, 88, 17, 14, 94, 82, 97, 61, 60

[56] References Cited

U.S. PATENT DOCUMENTS

| | | | |
|---|---|---|---|
| 4,205,200 | 5/1980 | Parikh et al. | 370/91 |
| 4,646,292 | 2/1987 | Bither | 370/83 |
| 4,727,537 | 2/1988 | Nichols | 370/94 |
| 4,736,369 | 4/1988 | Barzilai et al. | 370/82 |
| 4,740,958 | 4/1988 | Duxbury et al. | 370/88 |
| 4,742,511 | 3/1988 | Johnson | 370/94 |

OTHER PUBLICATIONS

Communications System EMS4100, Siemens (A309-51-D5079-A110-1-7618), pp. 01-03; 1-1 to 1-15; 2-1 to 2-21; 3-1 to 3-5; 4-1 to 4-7; 5-1 to 5-9; 6-1 to 6-2; 7-1; 8-1 to 8-3; 9-1.
European Computer Manufacturing Association, ECMA/TC24/84/223, pp. 31-33.

Primary Examiner—Donald J. Yusko
Attorney, Agent, or Firm—Hill, Van Santen, Steadman & Simpson

[57] ABSTRACT

A method for flow control of data exchanged via nodes connecting an origin and a destination to one another, in which the nodes are arbitrarily meshed within a data network and are connected to one another via lines and every node is equipped with a transmission memory and a reception memory device, includes the cyclical transmission of a first control signal (FCM1) in a prescribed time sequence and, as needed, a second control signal (FCM2) dependent on a data quantity within a time cycle which exceeds the quantity of data usually transmitted, these control signals being forwarded to the respectively adjacent nodes in case of unimpeded data transmission. In the jam condition, these flow control signals, (FCM1, FCM2) are omitted or modified and, after recognition by the respective nodes effect the inhibition of the corresponding transmission memory means (SS) at such node.

2 Claims, 1 Drawing Sheet

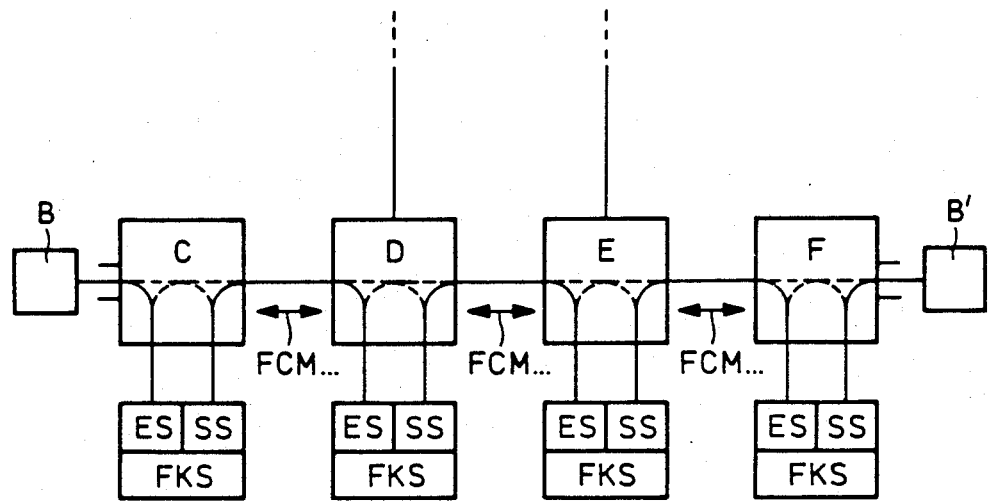

METHOD FOR FLOW CONTROL OF DATA WITHIN A MESHED DATA NETWORK

BACKGROUND OF THE INVENTION

The invention is directed to a method for flow control of data, by which users can exchange data via nodes connecting an origin to a destination in a network in which the nodes are connected to one another via arbitrarily meshed lines, and every node is equipped with a transmission memory means and with a reception memory means.

The flow control of data within meshed data networks serves the purpose of carrying out the transmission of data throughout the network without information losses. When there are a number of simultaneously users of the network, having different data transmission quantities, within the same period of time, a data jam can occur, which can lead to considerable disturbances in the network and potentially to total data loss. "European Computer Manufacturers Association" (ECMA/TC24/84/223, Supercedes 84/188), a European standard for computer users, discloses what is referred to as an "end-to-end flow control" method, wherein the memory means at the destination and origin nodes of a data connection are monitored to determine their data acceptance capability. In case a defined memory capacity is exceeded, then an inhibit bit is generated and returned from the transmission memory means at the destination node to the reception memory means at the originating mode. At the latter, this information effects the inhibition of the transmission, so that it is assured that data stored in the transmission memory means are no longer transmitted. However, as soon as the reception memory means is again capable of accepting further data, when the data jam in the originating node has been corrected, the transmission of further data from the destination node to the originating node is re-initiated with the transmission of a corresponding enable bit from the destination mode and the reception thereof at the originating node.

This monitoring of the data memories at the respective destination and originating nodes assures that the data transmission between these two nodes is protected, but it leaves the remaining transmission path out of consideration. However, since the greatest variety of users transmit their data with different data transmission rates, via a great variety of devices such as data terminals, computers, etc., particularly in extensive intermeshed data networks, there is a need for an expansion of the method known from the European standard.

BRIEF SUMMARY OF THE INVENTION

It is therefore a principal object of the present invention to provide a method for controlling an entire transmission line, which can include a plurality of series-connected nodes of very different types (viz., tandem, destination and originating nodes). In accord with the invention, this is achieved by a combination of features, involving the use of flow control signals, and the modification of such flow control signals in response to data jam conditions.

It is essential for the invention that all nodes participating in the connection emit a first flow control signal in a defined time cycle, this first flow controlsignal signaling the free status of the respective reception memory means and, thus, signaling the acceptance capability for further data quantities. However, insofar as a defined reception memory capacity has been reached within one or more corresponding nodes, the second flow control signal is immediately sent from the corresponding transmission memory means, this second flow control signal like the first flow control signal, likewise authorizing the respective transmission memory means for further, unimpeded data transmission on the basis of unmodified forwarding to the respective transmission memory devices from the reception memory devices of the respective preceding and/or following nodes.

Only in case a data jam in which one or more reception and/or transmission memory devices are exhausted in terms of their acceptance capacity, are these flow control signals (first and second) cancelled, or provided with an auxiliary identification and returned in the opposite direction i.e. back to the transmitting originating or destination nodes in the reverse direction, via a plurality of nodes if necessary. The failure of the flow control signals to arrive or, respectively, the recognition of the "modified" control signals within two time cycles, effects the inhibition of the corresponding transmission memory devices in the originating or destination nodes, and effects the switching of this transmission memory means from its "undisturbed" status into its "jam has occurred" status. Additional data exchange is suppressed until reception of the flow control signals, after the resolution of a data jam, this assuring that no data are lost regardless of the connecting path through the meshed data network.

In accord with an advantageous development of the invention, it is provided that, given failure of the flow control signals to arrive over two time cycles, the transmission memory means is switched from the "jam has occurred" status into the "line error" status, so that the data exchange is entirely interrupted in this case by a corresponding communication to the users, until the disturbed connecting path has been restored. An additional data protection is thus achieved.

BRIEF DESCRIPTION OF THE DRAWING

The method of the invention shall be set forth in greater detail with reference to an exemplary embodiment shown in the figure, this merely showing those circuit devices essential to the function as a block circuit diagram.

DESCRIPTION OF THE PREFERRED EMBODIMENT

The figure shows a data circuit which represents a portion of a meshed data network. The users B, B' are connected to one another via the nodes C-F through corresponding line sections. In this example, the nodes C and F form what are referred to as the originating/destination nodes, and the nodes D and E form what are referred to as tandem nodes. The tandem nodes D and E are marked by further connections to other nodes (not shown). Each of the nodes contains a flow control signal generator FKS and a reception memory means ES, as well as a transmission memory means SS. The connecting paths within the respective node C through F are indicated, these showing that both the reception direction as well as the transmission direction can proceed to both users B and B'. It is further indicated that the flow control signals FCM ... can be transmitted in both directions between the individual nodes, C-D, D-E, E-F. It is assumed in the exemplary embodiment that a data connection via the corresponding nodes C through F exists between the two users B, B', and that data are being both transmitted as well as received by both users B and B'.

As an example, let it be assumed that the user B who is directly connected to the originating node C transmits his data onto the data transmission line via the reception memory means ES present therein and, subsequently, via the transmission memory means SS. In the same sequence, these data are received by the tandem node D in the reception memory means ES thereof, and are forwarded in the same way to the next nodes E and F, via the transmission memory means SS present therein. Finally, the second subscriber B' receives the data from the destination node F via the transmission memory means SS situated therein.

During the transmission of these data, all nodes C through F participating in the connection respectively cyclically transmit a first flow control signal FCM1 in a prescribed time-sequence, which is received by the reception memory devices ES of the adjacent nodes C through F, respectively preceding and/or following, and which authorizes the respective nodes C through F for the acceptance of further data quantities by unmodified forwarding to the corresponding transmission memory device SF of the respective nodes C through F.

The flow control signal FCM . . . is generated by the flow control signal generator FKS, a switch means which is permanently allocated to every node C through F. Thus, as the first flow control signal FCM1 is transmitted in return direction, for example by the transmission memory means SS of the tandem node E, i.e. to the reception memory means ES of the tandem node D, and is received at the latter, the transmission memory device SS present in the node region D is authorized to send further data in the direction to the tandem node E. This indicates that there are no data jams within this transmission path. The first flow control signal FCM1 is forwarded unmodified in the same way to the next node, i.e. to the originating node C.

In addition to this first flow control signal FCM1, the nodes C through F participating in the connection transmit a second flow control signal FCM2, as needed dependent on a data quantity within a time cycle exceeding the average number of data to be transmitted, this second flow control signal FCM2 providing authorization for the acceptance of further data in the same way by unmodified forwarding to the transmission memory device SS of the respective nodes C through F from the respective reception memory devices ES of the respectively preceding and/or following nodes C through F. This second flow control signal FCM2, thus, is also forwarded from node to node unmodified, in the case of proper transmission of the data—i.e. without data jam.

When a data jam occurs, for example due to the overflow of a reception memory means within the data path, then the transmission memory means SS situated in the corresponding node, for example the tandem node E, either cancels both the cyclically emitted, first control signal FCM1 as well as the second flow control signal FCM2, or provides them with an auxiliary identification and transmits them with the transmission memory means SS in the usual way in the return direction, in this case, to the tandem node D. After the reception of the modified flow control signals FCM1, FCM2, these proceed to the originating node C and their failure to arrive there or, respectively, their arrival with their modified auxiliary identification, effects the inhibition of the transmission memory means SS located there, within two time cycles. In such case, the transmission memory device SS is switched from the status "undisturbed" into the status "jam has occurred". In response thereto, the user B is advised, by the missing or modified flow control signals, to transmit no further data to the reception memory means ES, so that data are no longer transmitted from the transmission memory means SS in the direction toward the user B'.

When this status is maintained over a timespan of more than two time cycles, then it can be assumed that a fault condition is present somewhere on the data path, which is no longer accepting further data transmission. In this case, the transmission memory device SS of the originating node C is switched from the status "jam has occurred" into the status "line fault". This status is communicated to the user B, so that the user B can interrupt the data exchange, and see that appropriate measures for restoring the disturbed data path are undertaken.

Since, in case of a jam, the flow control signals FCM . . . can be influenced by every node lying within the serial connection, it is not only the originating and destination nodes C and F allocated to the users which are directly monitored but, rather, all the nodes C through F participating in the connection. When the transmission and reception memory means SS and ES of the tandem nodes D and E are also used by other data circuits, transmission on such other circuits may be possible, as long as appropriate flow control signals are periodically received as expected.

The flow control signal FCM1 is generated periodically, with successive signals spaced apart by approximately the length of time required for an average transmission on the network. When these periodic signals are received on a repetitive basis, by all of the nodes in the path of the transmission, all such nodes are assured of continued network operation and transmissions are continued.

When a transmission exceeds an average transmission in the amount of time required and/or the amount of data transmitted, then the second flow control signal FCM2 is transmitted, as required, to designate a longer than normal transmission. The presence of the signal FCM2 assures network nodes of proper network operations in situations where the traffic is abnormal, in order that the transmission be continued until completion. The second flow control signal is preferably generated by the originator of the transmission, to designate a long transmission, and by each subsequent node, as long as no data jam occurs. Alternatively, it may be generated by any node in response to being polled by an adjacent node in response to a detected condition in which the transmission is abnormally long. In either case, an abnormally long transmission unaccompanied by the flow control signal FCM2 causes the adjacent node receiving the transmission to omit the FCM2 signal or to transmit it in modified form and/or to omit or modify the FCM1 signal, to signal a data jam. Thus, the receipt of FCM1 and FCM2 flow control signals indicates appropriate network flow for normal or long transmissions, and the absence of the FCM2 signal, with a long transmission, and the absence of the FCM1 signal under any condition alerts the adjacent nodes of a data jam, with the result that data flow is halted until the flow control signals are resumed.

It will be appreciated that ordinary logic means may be employed to check for periodic occurrence of the FCM1 signal and the FCM2 signal, as needed, so that apparatus for accomplishing this task may readily be designed by those skilled in the art using existing technology. Therefore, such apparatus need not be described in detail.

It will be apparent to those skilled in the art that various modifications and additions may be made in the apparatus of the present invention without departing from the essential features of novelty thereof, which are intended to be defined and by the appended claims.

What is claimed is:

1. A method for the flow control of data which users can exchange via nodes connecting an origin and a destination to one another, over arbitrarily meshed lines, and every node is equipped with a transmission memory device and a reception memory device, comprising the steps of;

cyclically sending, via the intermediate nodes (C . . . , F) a first flow control signal (FCM1) which provides an authorization for the acceptance of further data when forwarded in unmodified form to the transmission memory device (SS) of each of the respective nodes (C . . . , F) from each of the reception memory devices (ES), coincident with an average quantity of data transmitted between two users via the longest connecting path within the data network, in a prescribed periodic sequence longer than the time cycle required for such average transmission, transmitting a second flow control signal (FCM2), via said intermediate nodes, coincident with a larger than average quantity of data to be transmitted, which second flow control signal provides authorization for the acceptance of further data quantities in response to unmodified forwarding to the transmission memory device (SS) of the respective nodes (C . . . , F) from the reception memory devices (ES) of the respective preceding and/or following nodes (C . . . , F), providing an auxiliary identification for said first flow control signal (FCM1) or said second flow control signal (FCM2), in the case of a data jam indicated by nonreceipt, within a predetermined period of either of said first and second flow control signals in the reception memory device (ES) of the adjacent node (C . . . , F) and returning said modified flow control signal in the reverse direction by means of the transmission memory device (SS) of the adjacent node, inhibiting the respective transmission memory device (SS), at the nodes (C . . . F) between the origin and destination, in response to the failure of the unmodified first and second flow control signals (FCM1, FCM2) to arrive, or the reception of the first and second flow control signals (FCM1, FCM2) provided with said auxiliary identification, within a period of time corresponding to time cycles of said cyclical sending, and switching the respective transmission memory deice (SS) from a status corresponding to the "undisturbed" status into a status corresponding to a "jam has occurred" status in response to said inhibition.

2. The method according to claim 1, including the steps of changing the status, following a predetermined duration, of the respective transmission memory device (SS) from the "jam has occurred" status into the "line fault" status, in the nodes (C . . . F) forming the origin and destination, in response to the failure of the first and second unmodified flow control signals (FCM1, FCM2) to arrive, or the reception of the first and second flow control signals (FCM1, FCM2) provided with the auxiliary identification in the jam condition, and transmitting the "line fault" status to the respective users of the transmission memory device (SS).

* * * * *